Figure 1:
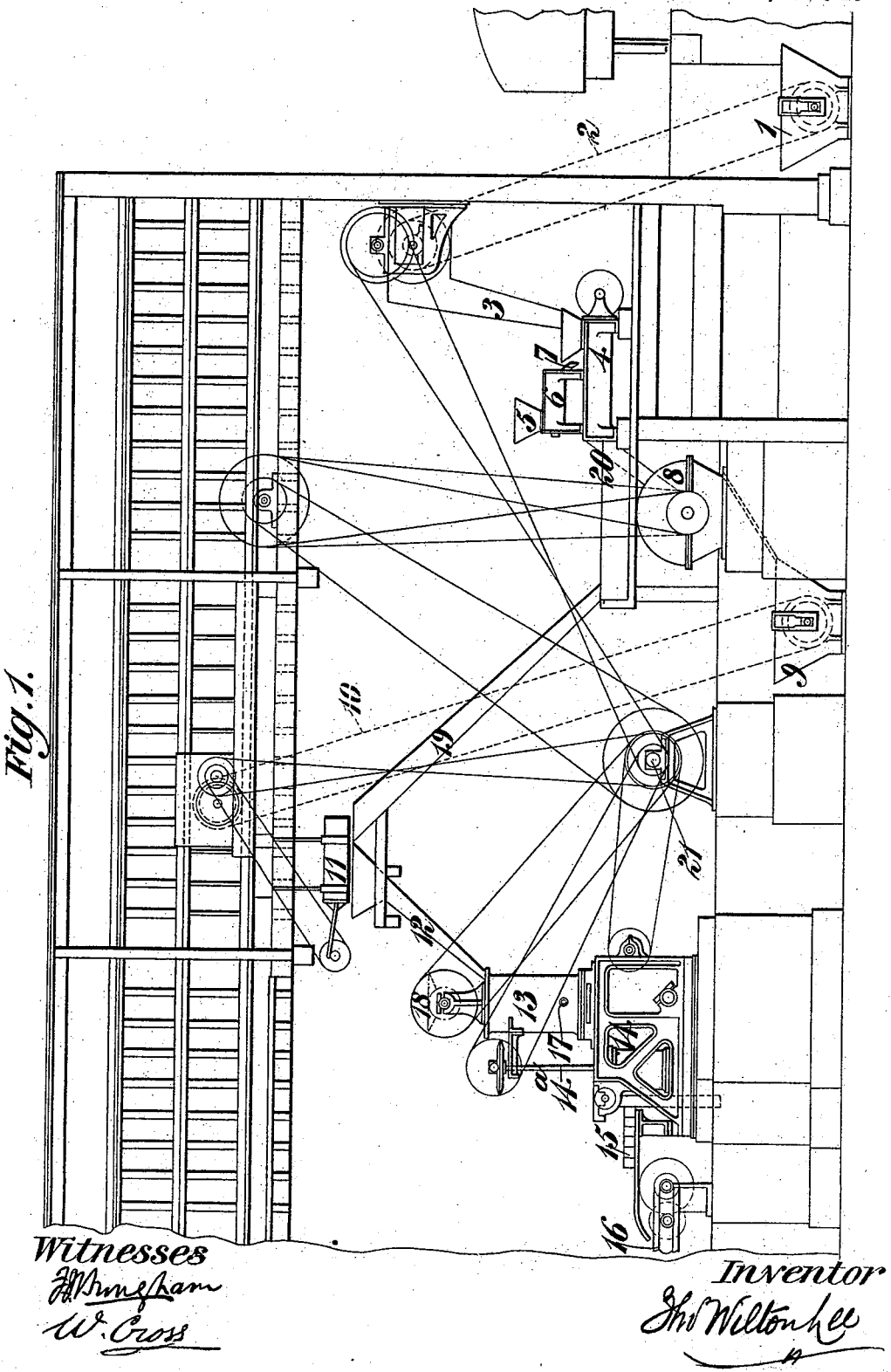

(No Model.)

T. W. LEE.
BLOCK OR BRIQUET OF FUEL.

No. 530,698.

Patented Dec. 11, 1894.

4 Sheets—Sheet 1.

Witnesses

Inventor (No Model.) 4 Sheets—Sheet 2.

T. W. LEE.
BLOCK OR BRIQUET OF FUEL.

No. 530,698. Patented Dec. 11, 1894.

Witnesses
W. Cross

Inventor
Thos Wilton Lee (No Model.)  4 Sheets—Sheet 4.
T. W. LEE.
BLOCK OR BRIQUET OF FUEL.

No. 530,698. Patented Dec. 11, 1894.

Witnesses  Inventor

UNITED STATES PATENT OFFICE.

THOMAS WILTON LEE, OF LONDON, ENGLAND.

BLOCK OR BRIQUET OF FUEL.

SPECIFICATION forming part of Letters Patent No. 530,698, dated December 11, 1894.

Application filed January 25, 1893. Serial No. 459,695. (No specimens.) Patented in England September 2, 1892, No. 15,748, and January 7, 1893, No. 392; in Belgium March 14, 1893, No. 103,828; in France March 15, 1893, No. 228,634; in Spain June 26, 1893, No. 14,531; in Italy June 30, 1893, LXVII, 328; in Canada October 6, 1893, No. 44,416; in Austria-Hungary January 3, 1894, No. 32,634, and in India September 3, 1894, No. 80 and No. 81.

*To all whom it may concern:*

Be it known that I, THOMAS WILTON LEE, a subject of the Queen of Great Britain and Ireland, residing at Northumberland Avenue, in the county of London, England, have invented Improvements in the Manufacture of Blocks or Briquets of Fuel, of which the following is a specification.

This invention was patented in Great Britain September 2, 1892, No. 15,748, and also January 7, 1893, No. 392; in India September 3, 1894, No. 80 of 1894, and also No. 81 of same date; in Canada October 6, 1893, No. 44,416; in Belgium March 14, 1893, No. 103,828; in France March 15, 1893, No. 228,634; in Austria-Hungary January 3, 1894, No. 32,634; in Spain June 26, 1893, No. 14,531, and in Italy June 30, 1893, Reg. Att. Vol. LXVII, No. 328.

This invention has reference to improvements in the manufacture of cakes, blocks, or briquets of fuel. According thereto powdered carbonaceous material is converted into cakes, blocks or briquets of fuel by the addition of a binding mixture of suitable organic substances of the character hereinafter indicated, and caustic alkaline earth, the mixture of organic substance and alkaline earth being added to and mixed with the carbonaceous material, and the whole then subjected to the action of moist heat by direct application of steam; and being also immediately pressed into cakes, blocks or briquets of the desired form and size.

In carrying out my invention the following substances may be employed:—(*a*) As the carbonaceous material: Small coal, or "smudge" or "dant" or coke, or peat, or a mixture of some or all of these substances. (*b*) As the organic substance to form (with alkaline earth) the binding mixture: Finely ground flour, starch, or any powdered farinaceous substances, ground oil-cake, potato-flour, or other organic substance analogous in the sense of containing either gluten or starch or both (or in some cases a mixture of such substances might be usefully employed). Such organic substances are sometimes hereinafter referred to under the generic term of farina. (*c*) As the alkaline earth: Powdered lime, strontia, magnesia, or baryta (or a mixture of such).

In using the substances above mentioned under heads (*a*) (*b*) and (*c*) the proportions will depend upon the substances used.

When using ground anthracite coal, I prefer to use a binding mixture containing flour of wheat or maize (using damaged flour where practicable for the sake of cheapness) and lime, or flour and strontia, or flour and magnesia, or flour and baryta, the proportion of these substances depending upon the condition and the quality of the anthracite coal employed. For instance, if the anthracite be damp, a larger proportion of binding material must be used; also, if the proportion of ash in the anthracite be large, a smaller quantity of the binding agent will suffice. With bituminous coals, it is advantageous to replace the flour, wholly or in part, by a proportion of starch; but when starch is used, I find that the proportion of binding agent in relation to the quantity of coal used has to be increased. For instance, instead of using a binding agent containing two parts of flour and two parts of lime, it will usually be more advantageous to use, say, one part of flour, one part of starch, and two parts of lime; or, better still to use four parts of starch, or even more, with two parts of lime, and instead of using a binding agent containing (say) two parts by weight of flour and two parts by weight of lime, to one hundred parts by weight of coal (which is suitable for anthracite coal) it will be usually more advantageous (for example) to use with (say) one hundred parts by weight of bituminous coal, one part by weight of flour, one part by weight of starch, and two parts by weight of lime; or, better still, to use four parts of starch, or even more, with two parts of lime, and one hundred parts of bituminous coal; flour being in this case wholly dispensed with.

In all cases it will be advisable, when using soft bituminous coal, to replace the whole of the flour by starch, in order to avoid risk of spontaneous combustion when the finished blocks or briquets are stored.

When using ground coke or peat, the binding agent may consist of flour and lime, or flour and strontia, or flour and magnesia, or flour and baryta.

I find, when using caustic alkaline earth other than lime (for examples, strontia, or magnesia or baryta) that the proportion of these alkaline earths must be increased. It may be for example about threefold, to obtain the desired result. Consequently I prefer, for the sake of economy, to use a binding mixture containing lime and flour for anthracite coals; and, for bituminous coals, a mixture of lime and flour, part or the whole of the flour being replaced by starch.

In carrying out my invention satisfactory results can be obtained by mixing together about one hundred parts by weight of ground coal, two parts by weight of flour (obtained from damaged Indian corn that was unfit for use as food and therefore very cheap) and two parts by weight of caustic lime. The flour and lime are mixed together, and are then intimately mixed (by any suitable means) with the small coal, which (as usual in briquet making) must be reduced to a fine powder before entering the briquet molding machine. The mixture is conveyed to, and put into, a hopper from which it passes into the supply cylinder attached to a suitable briquet machine, into which "live" steam enters. A mechanical stirrer passes through the center of the cylinder, and agitates the mass, which eventually falls into the molding machine, wherein it is converted into briquets in the ordinary manner.

Satisfactory results will be obtained by using steam at pressures varying from about fifteen pounds to thirty pounds on the square inch, the steam being introduced through two nozzles, each having an outlet of about one inch in diameter. As will be obvious, however, I do not limit myself to the exact proportions of materials and steam pressures mentioned as the same can be varied to suit different classes of coal, without departing from the essential feature of my invention. In all cases, however, the proportion of cementing material need only be small, so that the cost of the binding agent will not be great, and it will add very little to the percentage of the noncombustible matter present in the finished briquets.

It must be understood that, under the term "flour" I include meal farina, flour dust, and all such powdered grain products. They need not be pure, but if used in a condition in which there is much inorganic matter allowance should be made for its presence by increasing the quantity of flour used.

For the purpose of explaining how my invention can be carried into practical effect, I will now describe a convenient arrangement of apparatus for the purpose, but it will be understood that I in no sense restrict myself to the use of this particular arrangement, because any other suitable apparatus may be employed.

Figure 2:
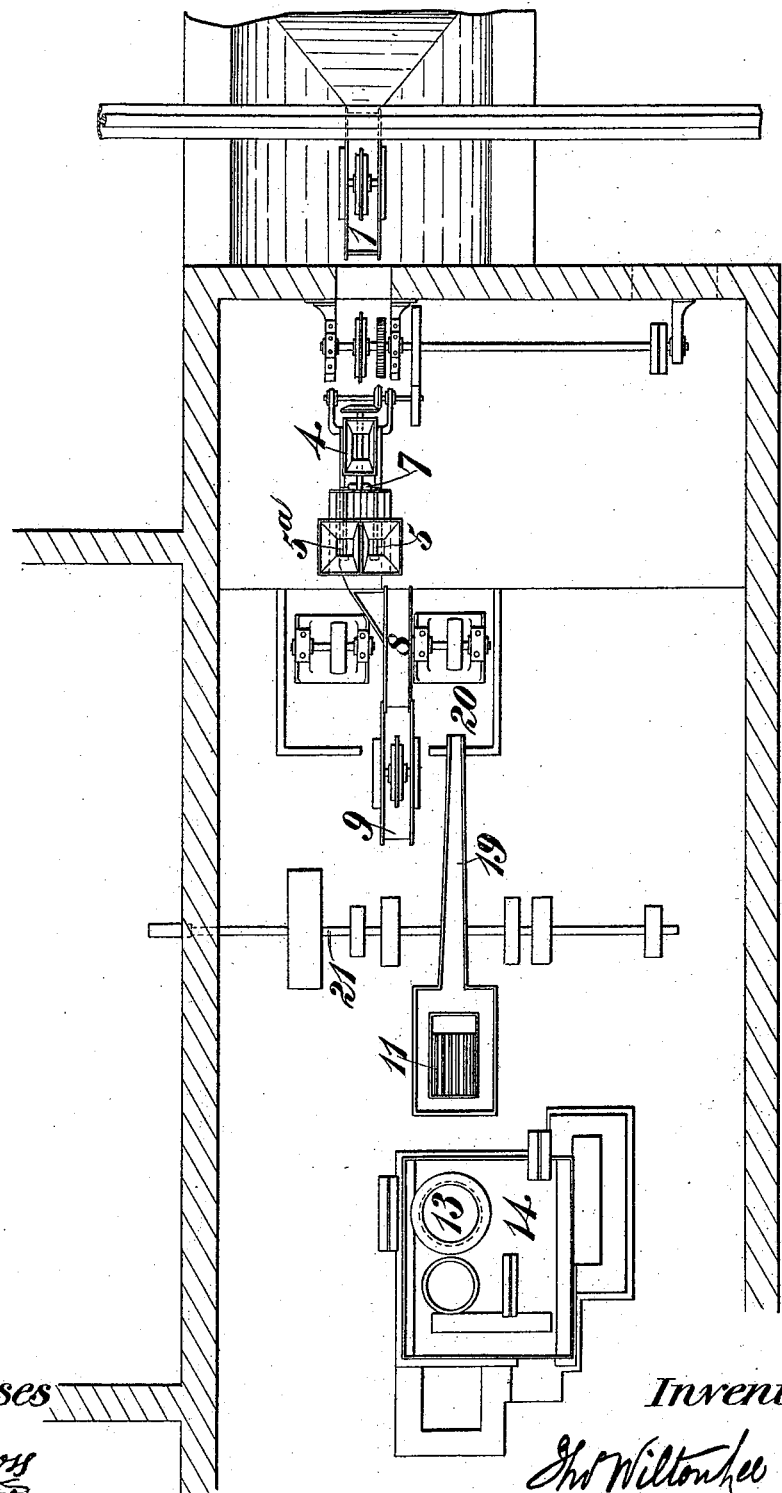
Figure 3:
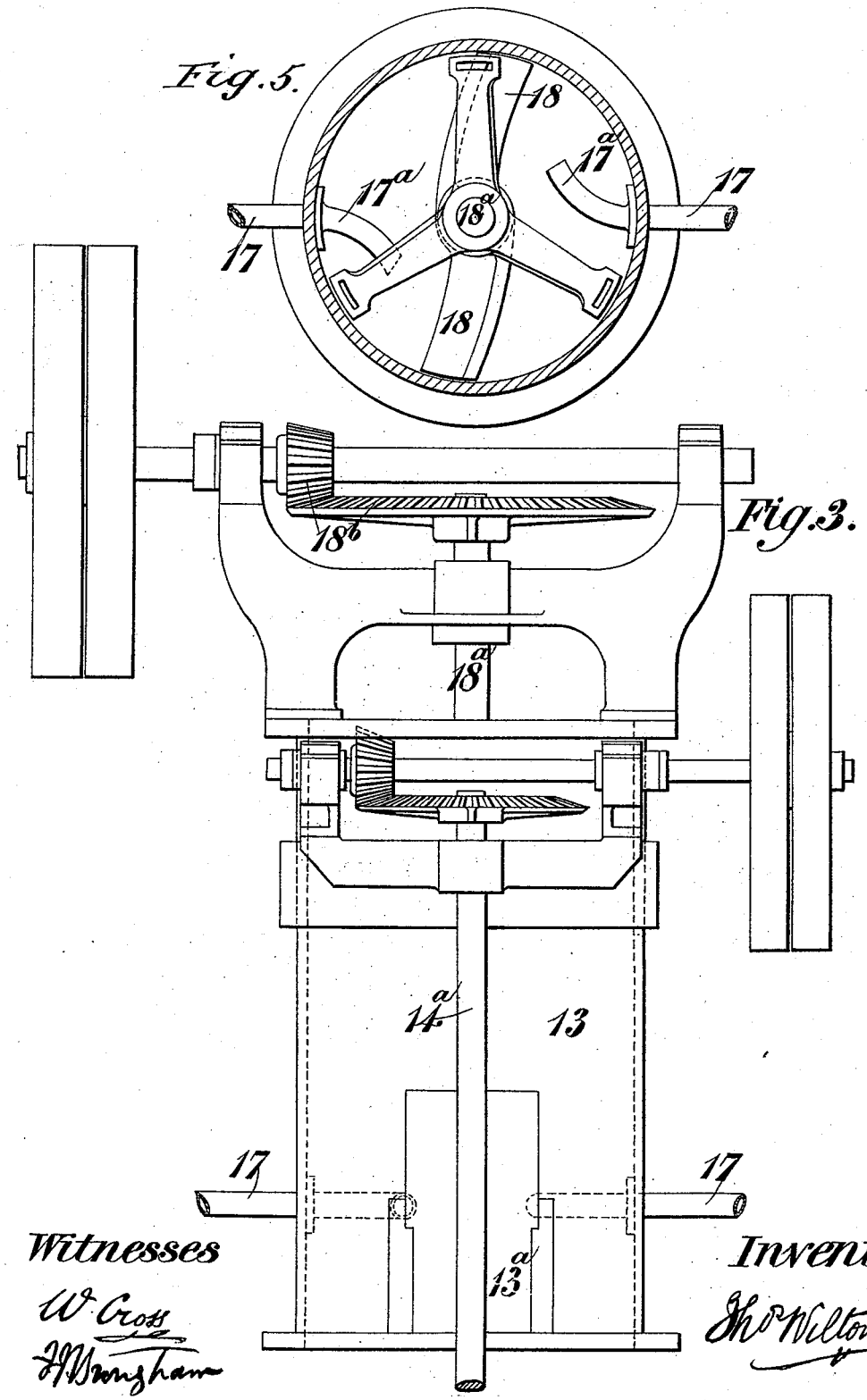
Figure 4:
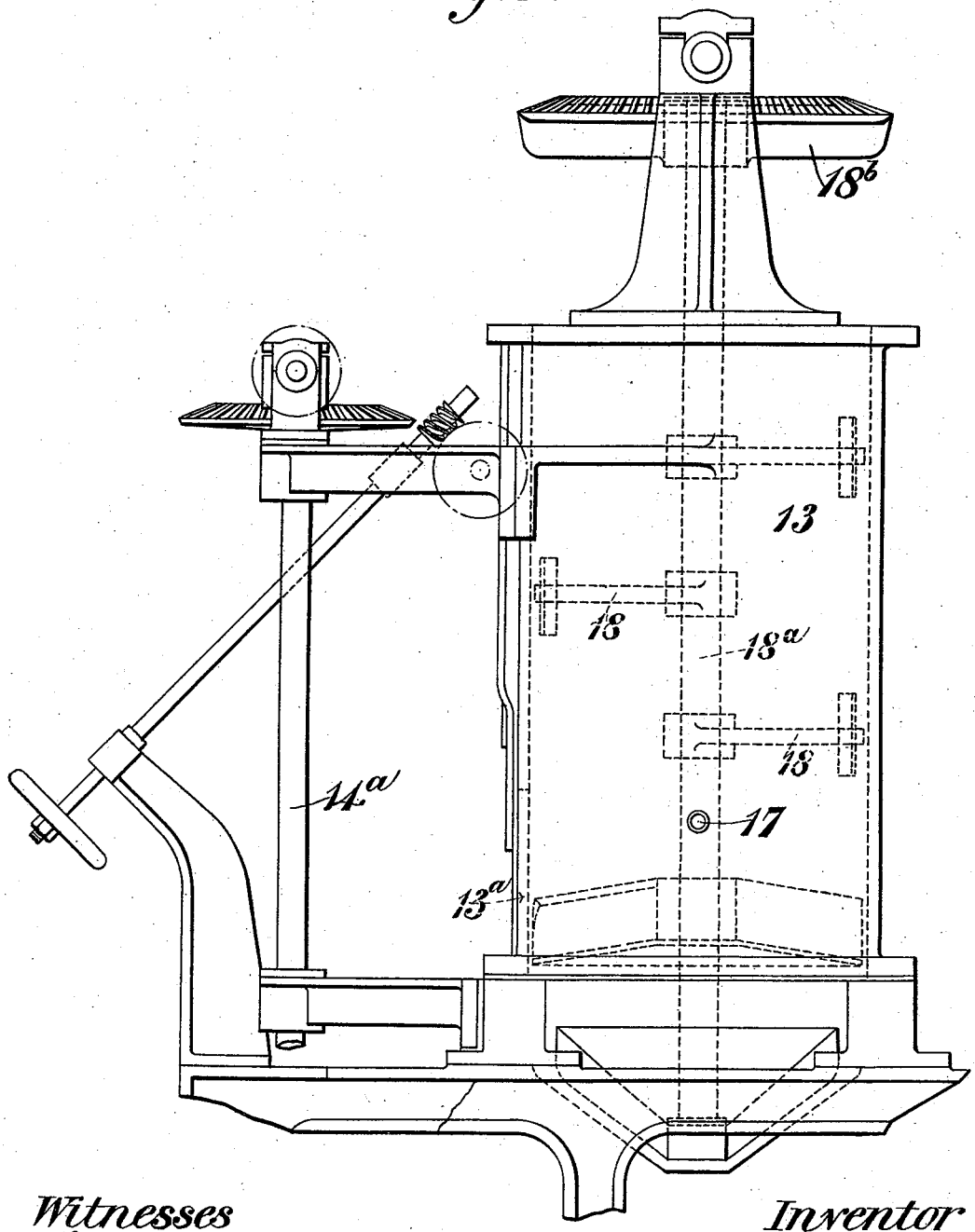

Referring now to the accompanying drawings, Figure 1 is a side elevation; and Fig. 2 is a part plan, illustrating a suitable arrangement of plant for carrying out my invention. Figs. 3 and 4 are elevations at right angles to each other, and Fig. 5 is a plan showing to a larger scale than Figs. 1 and 2, the vertical cylinder or heater in which the intimate mixture of coal, flour and lime is treated with steam.

1 is a hopper into which the carbonaceous material, such as small coal, smudge, or dant or the like to be formed into briquets is delivered from a railway wagon or other suitable source of supply. 2 is a bucket conveyer, by which this coal or carbonaceous material is delivered into a chute 3, by which it is discharged into a measuring vessel 4, into which the binding mixture is also delivered from hoppers 5, $5^a$ by a screw conveyer 6 and chute 7.

8 is a disintegrator or mixing apparatus by which the coal or carbonaceous material is ground to a fine powder and intimately mixed with the flour and lime or other substances intended to form the binding mixture and which are supplied from the vessel 4. The resulting mixture passes into a hopper 9, from which it is raised by a bucket elevator 10 and discharged into a vibrating screen 11, through which it falls into a chute 12, by which it is conducted to a heater or cylinder 13, and thence (in the ordinary manner) through an adjustable lateral opening $13^a$, to a briquet molding machine 14, which may be of any suitable construction, and wherein the mixture is converted into briquets 15. $14^a$ is the driving shaft of such machine.

The briquets may be delivered on to an endless conveyer belt 16, by which they can be led to any suitable place.

17, 17 are steam pipes for supplying steam to nozzles $17^a$ arranged within and near the lower part of the heater or cylinder 13 (Figs. 3, 4 and 5) whence the steam issues so as to mix with, and heat, and moisten, the mixture. The mixture is kept in constant motion by a rotary agitator which comprises arms 18 fixed to a shaft $18^a$ arranged within the heater or cylinder and driven by bevel gearing $18^b$, as well understood.

19 is a chute, by which material that is too large to pass the screen 11 is returned to a receptacle 20, and thence to the disintegrator to be further dealt with.

21 is a driving shaft, from which the several elevators, (which are shown diagrammatically) the disintegrator, the vibrating screen, the rotary agitator and the briquet molding machine are driven by pulleys and belting, in a manner that will be readily understood from the drawings, without further description.

By my invention I am enabled to produce, in an economical manner solid blocks or briquets of fuel without the use of pitch and such like objectionable agents.

What I claim is—

1. The process of manufacturing blocks or briquets of fuel which consists in intimately mixing in the dry state powdered carbonaceous fuel with a binding agent composed of organic material and caustic alkaline material, subjecting the mixture to the direct action of steam, and compressing the mixture while in a moist and heated condition into blocks or briquets substantially as described.

2. The process of manufacturing blocks or briquets of fuel which consists in intimately mixing in the dry state powdered carbonaceous fuel with a binding agent composed of flour and lime, subjecting the mixture to the direct action of steam, and compressing the mixture while in a moist and heated condition into blocks or briquets substantially as described.

In testimony whereof I have signed my name to this specification in the presence of two subscribing witnesses.

THOMAS WILTON LEE.

Witnesses:
WILLIAM CROSS,
46 *Lincoln's Inn Fields, London, W. E.*
WM. THOS. MARSHALL,
2 *Pope's Head Alley, Cornhill, London, Gentn.*